Figure 1:
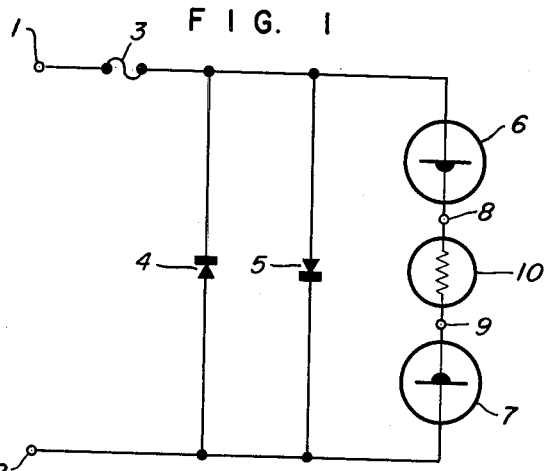

June 1, 1965

R. A. LE MASSENA 3,187,224

CONTROLLING APPARATUS FOR PROTECTING LOW CURRENT
SENSITIVE MEASURING INSTRUMENTS

Filed Aug. 21, 1961

*INVENTOR.*
Robert A. Le Massena

BY Arthur H. Swanson

ATTORNEY.

United States Patent Office 3,187,224
Patented June 1, 1965

3,187,224
CONTROLLING APPARATUS FOR PROTECTING LOW CURRENT SENSITIVE MEASURING INSTRUMENTS
Robert A. Le Massena, Denver, Colo., assignor to Honeywell Inc., a corporation of Delaware
Filed Aug. 21, 1961, Ser. No. 132,891
8 Claims. (Cl. 317—16)

The present invention relates generally to apparatus for protecting electrical components from receiving currents and/or voltages of magnitudes which would otherwise damage these components. More specifically, the invention relates to protecting apparatus of this type which is particularly adapted for protecting low current, sensitive measuring instruments, such as galvanometers.

A general object of the present invention is to provide improved apparatus for protecting electrical devices or components, such as sensitive measuring instruments, from receiving currents and/or voltages of such magnitudes as to damage these components. A specific object of the invention is to provide improved apparatus of this type for preventing more than a safe value of current from flowing through a sensitive, low current instrument, such as a galvanometer.

The desirability of protecting low current galvanometers, such as those used in oscillographs, from excessive, damaging currents has long been recognized. However, adaquate protection of this type has, in the past, been difficult to achieve, since the characteristics of such galvanometers relative to the characteristics of the known types of protective devices, such as fuses and circuit breakers, are such as to make the known devices and arrangements unsuitable for protecting such galvanometers in most instances.

For example, the current (or voltage) levels at which damage to such galvanometers occurs are quite low, as are the permissible coil circuit resistances. However, fuses having current ratings comparable with these low maximum galvanometer currents have such high resistances, compared to the coil circuit resistances, as to make the use of fuses for such protecting purposes entirely impractical in most instances. Also, the short time in which galvanometer damage occurs in the presence of excessive currents, plus the low voltage and power available in the coil circuits for operating a protecting device, both contribute to make the previously known protective devices and arrangements generally unsuitable in practice.

Therefore, it is a prime object of the present invention to provide a novel protecting apparatus or circuit arrangement, for use with a galvanometer or similar device, which, upon the development of a fault or condition which would tend to cause an unsafe, damaging value of current to flow through the galvanometer coil, operates to limit the current through the coil to a safe value sufficiently rapidly to prevent the occurence of any damage to the galvanometer.

To the end of fulfilling this object, as well as those set forth above, the novel protecting apparatus according to the present invention utilizes the interaction between a fuse, a pair of first or parallel diodes, and a pair of tunnel diodes connected in a novel circuit configuration to obtain the desired protection of the device to be protected. In this apparatus, the tunnel diodes are connected in series with the protected device, such as a galvanometer coil, and this series branch is connected in parallel with the other diodes. The whole parallel combination is then connected to the source of current in series with the fuse. As a result, upon the occurrence of a fault, the tunnel diodes limit the coil current to a safe value during the time in which the parallel diode current is rising to the value necessary to blow the fuse and hence disconnect the coil from the source.

Figure 3:
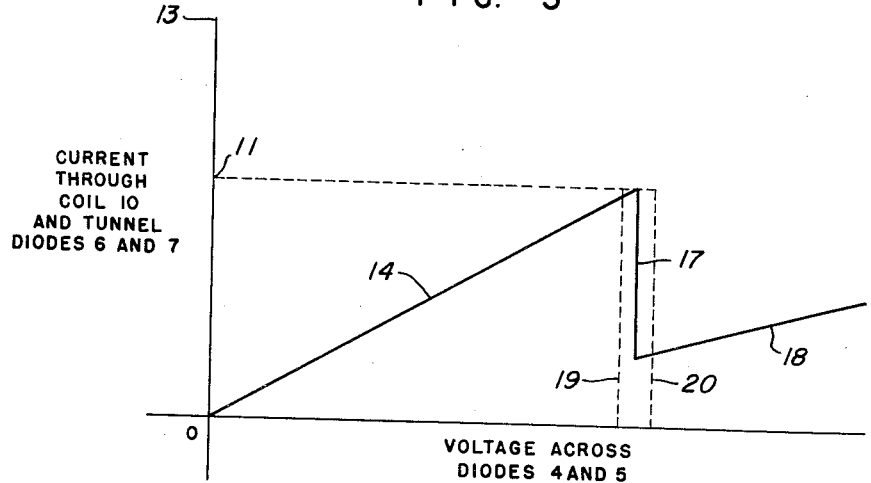
Figure 2:
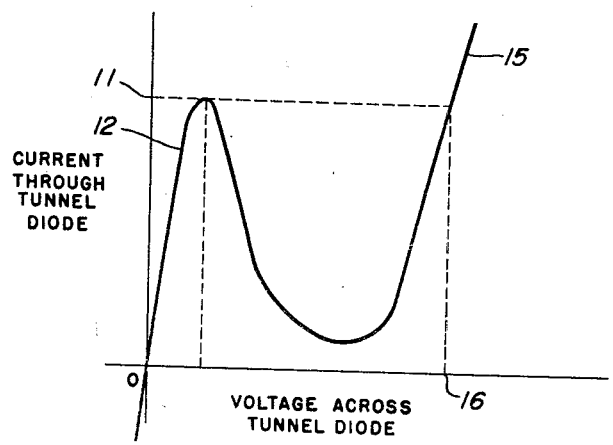

A better understanding of the present invention may be had from the following detailed description of apparatus embodying the invention, which description is to be read in connection with the accompanying drawings, wherein:

FIG. 1 is a schematic circuit diagram of a preferred form of protecting apparatus or protector according to the present invention;
FIG. 2 is a typical characteristic curve for the tunnel diodes of the apparatus of FIG. 1; and
FIG. 3 is a typical operating curve for the apparatus of FIG. 1.

The novel protecting apparatus of FIG. 1 includes input terminals 1 and 2, a fuse 3, first or parallel diodes 4 and 5, tunnel diodes 6 and 7, and output terminals 8 and 9. The device to be protected, shown in FIG. 1 as a galvanometer coil 10, is connected between the output terminals 8 and 9, the terminal 8 being in turn connected through the tunnel diode 6 and the fuse 3 to the input terminal 1, and the terminal 9 being in turn connected through the tunnel diode 7 to the input terminal 2. As a result, the coil 10 is connected in series with the fuse 3 and the tunnel diodes 6 and 7 between the input terminals 1 and 2. As shown in FIG. 1, the tunnel diodes 6 and 7 are connected reversely or back-to-back with respect to each other in the series circuit with the coil 10.

The diode 4 is connected in parallel with the series combination of the coil 10 and the tunnel diodes 6 and 7, as is the diode 5. As shown in FIG. 1, however, each of these parallel diodes 4 and 5 is so connected as to be conductive in the opposite direction.

In operation, the terminals 1 and 2 are connected to the external points, not shown, between which the coil 10 would have normally been connected directly if the protecting apparatus of the present invention were not being employed. Thus, said points are those between which there normally appears the input current or voltage or signal to which the coil 10 is to respond. As long as the resulting current which flows through the coil 10 is below a predetermined value which is the maximum current value which the galvanometer can safely stand, the tunnel diodes 6 and 7 have no significant effect in the circuit, but merely allow the usual coil current to flow through the coil 10. Likewise, at the input voltages associated with these safe values of current, the parallel diodes 4 and 5 have no significant effect on the response of the coil 10 to the input current and voltage.

Further, the fuse 3 also does not significantly affect this normal operation and response of the coil 10. The reason for this is that this fuse 3 is so chosen that its resistance does not adversely affect the response of the coil 10 to the normal currents and voltages. The current rating of such a fuse is, however, as explained above, considerably above the said predetermined maximum safe value of galvanometer current, and hence, by itself, this fuse would not afford the necessary protection to the galvanometer. But in the FIG. 1 combination with the tunnel diodes 6 and 7 and the parallel diodes 4 and 5 according to the present invention, the fuse 3 cooperates in providing the coil 10 with the desired protection as will be described more fully hereinafter.

The operation of the FIG. 1 apparatus can best be understood by reference to the typical tunnel diode characteristic curve of FIG. 2 and the typical circuit current vs. voltage operating curve of FIG. 3. It is seen from the FIG. 2 tunnel diode characteristic that, for currents below a predetermined, critical value 11, one of the tunnel diodes 6 and 7, depending upon the polarity of the input signal, will be operating over a first portion 12 of its characteristic, with a relatively small voltage drop. In accordance with the invention, the diodes 6 and 7 are so chosen or selected that the current value 11 is below said predetermined maximum safe galvanometer current, shown typically in FIG. 3 at 13. As a result, as long as the current through the coil 10 and the tunnel diodes 6 and 7 is below the value 11, and hence is within the safe operating range for the galvanometer, the coil 10 responds to the input signal and operates normally as explained above. The portion 14 of the FIG. 3 operating curve shows this normal operation of the coil 10.

Upon the occurrence of a condition or fault which causes the input voltage to rise to such a value that the coil current rises to the value 11, the operation of one or both of the tunnel diodes 6 and 7 transfers abruptly from the portion 12 to the portion 15 of its FIG. 2 characteristic. As a result, the voltage drop across the affected tunnel diode suddenly increases to or above a much higher value 16. The effect of this is that the current through the coil 10 is suddenly reduced, and then limited to a safe value, as shown by the portions 17 and 18 of the curve of FIG. 3. The space between the lines 19 and 20 in FIG. 3 is a so-called cut-off zone for the tunnel diodes, and is the zone in which the tunnel diode operation shifts between the operating characteristic portions 12 and 15.

This coil current limiting action of the tunnel diodes 6 and 7 is needed because there are no known diodes, for use as the parallel diodes 4 and 5, which, at the relatively low values of input voltage which would cause damaging currents to flow through the coil 10, would be sufficiently conductive to protect the coil 10 themselves. In other words, in the absence of the tunnel diodes 6 and 7, the increasing input voltage of the fault would cause damaging currents to flow through the coil 10 before the diodes 4 and 5 would have become sufficiently conductive to have any significant limiting effect on the coil current.

As the input voltage continues to rise in the presence of the fault, however, one or both of the parallel diodes 4 and 5, depending upon the nature of the input signal, start to conduct effectively, eventually causing the fuse 3 to blow and thus to disconnect the coil 10 from the input signal. During this time, however, the tunnel diodes 6 and 7 continue to limit the coil current to a safe value in spite of the rising input voltage.

The need for the cooperative action of the tunnel diodes 6 and 7, the parallel diodes 4 and 5, and the fuse 3 in the FIG. 1 apparatus should be obvious in the light of the foregoing description. The fuse or final disconnecting or interrupting element has a desirably low resistance, but this is inherently accompanied by an undesirably high current rating. The parallel diodes 4 and 5 serve to draw sufficient current in cooperation with the current in the coil 10 to blow the fuse 3 without requiring this excessive current to pass through the coil 10. However, since there are no known diodes which will draw this needed fuse-blowing current for voltages of the order of those which would otherwise cause excessive, damaging currents to flow through the coil 10, the tunnel diodes 6 and 7 are needed to limit the coil current to a safe value while the input voltage is building up to the value necessary to actuate the parallel diodes 4 and 5 to cause them to blow the fuse 3. The latter is needed, of course, to provide an interruption of the coil circuit before the input voltage reaches a value at which a damaging current would flow through the coil 10 notwithstanding the presence of the diodes 6 and 7.

By way of illustration and example, and not by way of limitation, it is noted that, for a typical galvanometer whose maximum safe coil current 13 is of the order of 10 ma., and whose coil circuit resistance is of the order of 25 ohms, the fuse 3 may well have a current rating of 0.125 amp., the parallel diodes 4 and 5 may well be silicon diodes of the 1N457 type, and the tunnel diodes 6 and 7 may well be of the 1N2941 type, for which the current value 11 is approximately 4.7 ma. and the voltage drop value 16 is approximately 500 mv.

While the FIG. 1 apparatus has been illustrated as providing protection for a galvanometer, and while this apparatus is particularly well suited for use with galvanometers, as noted herein, it should also be noted that such apparatus can, if desired, be used to protect any electrical component or device from the flow therethrough of an unsafe value of current. In each case, the fuse, parallel diodes, and tunnel diodes should be so selected that the fuse resistance does not adversely affect the normal operation of the device, and that the tunnel diodes protect the device, upon the occurrence of a fault, until the parallel diodes conduct sufficiently to blow the fuse. Also, if desired, additional diodes can be added in series with the parallel diodes 4 and 5 as dictated by the values of input voltage involved.

*Summary*

As is readily apparent in the light of the foregoing description, the present invention provides a novel protecting apparatus for galvanometers and other such electrical devices which utilizes the conjoint action, in a novel circuit configuration, of a desirably low resistance (but undesirably high current) fuse, diodes to blow the fuse in the event of a fault, and tunnel diodes to limit the device current to a safe value until the first mentioned diodes have blown the fuse. This apparatus according to the invention is fast and reliable in operation, is of simple and rugged construction, and is of small size and low cost.

What is claimed is:

1. Protecting apparatus, comprising an electrical element which operates over a first current-voltage drop characteristic portion for currents up to a critical value, and which operates over a second, displaced current-voltage drop characteristics portion for currents above said critical value, the voltage drops associated with said second characteristic portion being significantly greater than those associated with said first characteristics portion, means connecting to a source of current said element and a current-sensitive interrupting means in a series circuit with an electrical device to be protected from the flow therethrough of currents in excess of a predetermined value, said element operating over said second characteristic portion to tend to limit the current flow through said device to values below said predetermined value whenever the current flow through said element exceeds said critical value therefor, and a diode connected in series with said interrupting means and in parallel with said element and said device in series to conduct current through said interrupting means and around said element and said device in series whenever the current flow through said device approaches said predetermined value therefor, the current flows through said device and said diode in parallel being operative to cause said interrupting means to interrupt said series circuit.

2. Apparatus as specified in claim 1, wherein said device is the relatively low resistance coil of a galvanometer, and wherein said interrupting means is a fuse having a resistance which is relatively low compared to said coil resistance.

3. Protecting apparatus, comprising a tunnel diode connected in series with an electrical device to be protected from the flow therethrough of currents in excess of a predetermined value, a diode connected in a parallel circuit with said series-connected tunnel diode and device, and arranged to conduct current around said series-connected tunnel diode and device, circuit means for connecting said parallel circuit to a source of electricity to which said device is responsive, and an electrical fuse element connected in series in said circuit means.

4. Apparatus as specified in claim 3, wherein said device is the relatively low resistance coil of a galvanometer, and wherein said fuse element has a resistance which is low compared to said coil resistance.

5. Protecting apparatus, comprising two tunnel diodes connected in reverse relationship in series with an electrical device to be protected from the flow therethrough of currents in excess of a predetermined value, a first diode connected in a parallel circuit with said series-connected tunnel diodes and device, a second diode connected in parallel with said first diode but in reversely conductive relationship with respect to said first diode, circuit means for connecting said parallel circuit to a source of electricity to which said device is responsive, and an electrical fuse element connected in series in said circuit means.

6. Protecting apparatus, comprising a pair of input terminals adapted to be connected to a source of electricity, a pair of output terminals adapted to be connected to an electrical device responsive to said electricity, a first circuit connected across said input terminals and including in series an electrical fuse element, a tunnel diode, and said output terminals, and a second circuit connected across said input terminals and including in series said fuse element and a diode.

7. Protecting apparatus, comprising a pair of input terminals adapted to be connected to a source of electricity, a pair of output terminals adapted to be connected to an electrical device responsive to said electricity, a first circuit connected across said input terminals and including in series an electrical fuse element, said output terminals, and two tunnel diodes connected in reverse relationship with respect to each other, a second circuit connected across said input terminals and including in series said fuse element and a first diode, and a third circuit connected across said input terminals and including in series said fuse and a second diode connected in reversely conductive relationship with respect to said first diode.

8. Protecting apparatus, comprising a pair of input terminals adapted to be connected to a source of electricity, a pair of output terminals adapted to be connected to an electrical device responsive to said electricity, a fuse and a first tunnel diode connected in series between one of said input terminals and one of said output terminals, a second tunnel diode connected between the other of said input terminals and the other of said output terminals, said tunnel diodes being connected in reverse relationship with respect to each other, a first diode connected between said other of said input terminals and the junction between said fuse and said first tunnel diode, and a second diode connected in parallel with said first diode but in reversely conductive relationship thereto.

References Cited by the Examiner

"Protection for Your Meter Movement," Prvitt, Electronics World, August 1959.

"Silicon Rectifier Circuit Protects D.C. Meter," Electronic Design, February 5, 1958.

"Tunnel Diode Applications," Todd, Hughes Semi Conductor Division Application Engineering Notes (6 pages available), May 1960.

SAMUEL BERNSTEIN, *Primary Examiner.*

LLOYD McCOLLUM, *Examiner.*